R. B. HASTINGS.
STEERING WHEEL LOCK FOR MOTOR VEHICLES.
APPLICATION FILED NOV. 8, 1916.
1,260,283.
Patented Mar. 19, 1918.
2 SHEETS—SHEET 2.
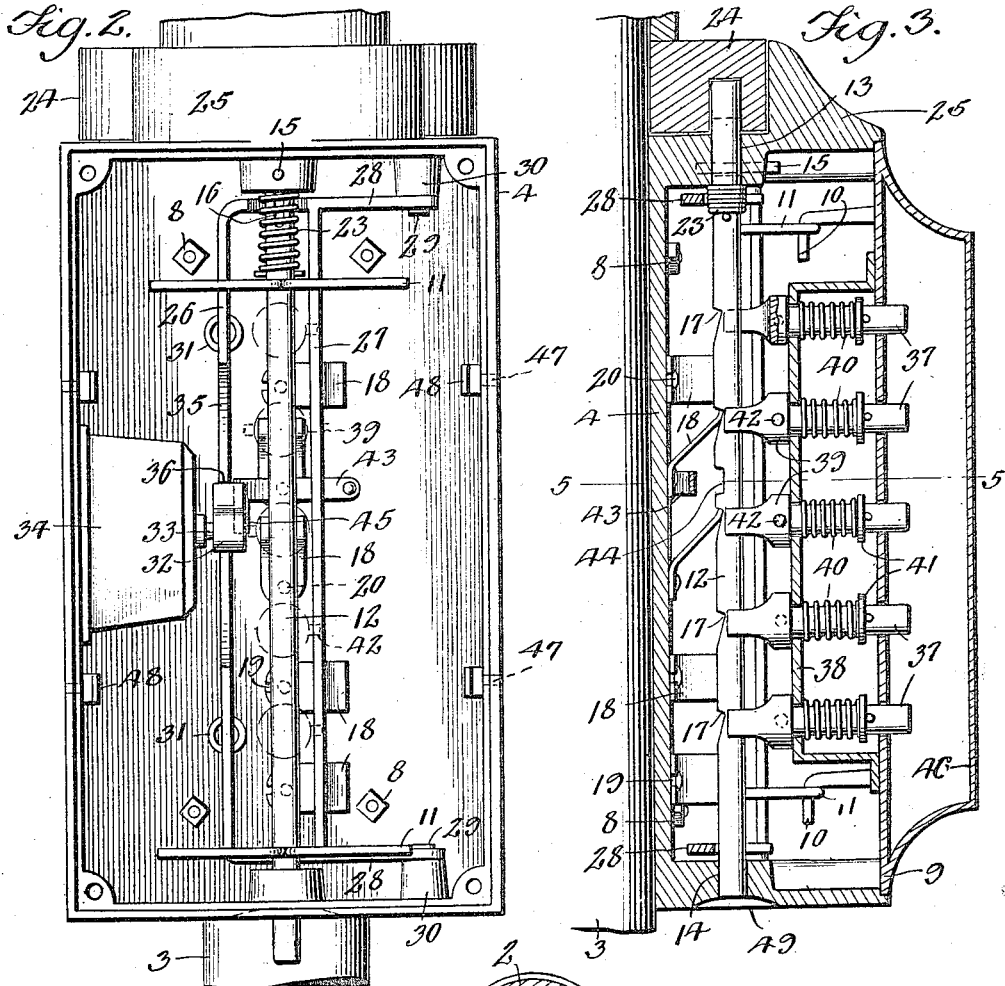
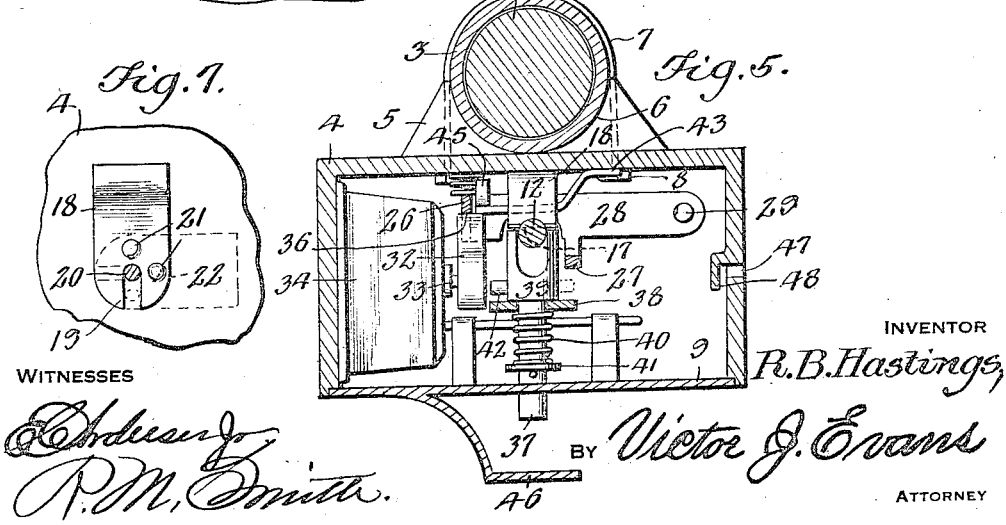
INVENTOR
R. B. Hastings,
BY Victor J. Evans
ATTORNEY
WITNESSES

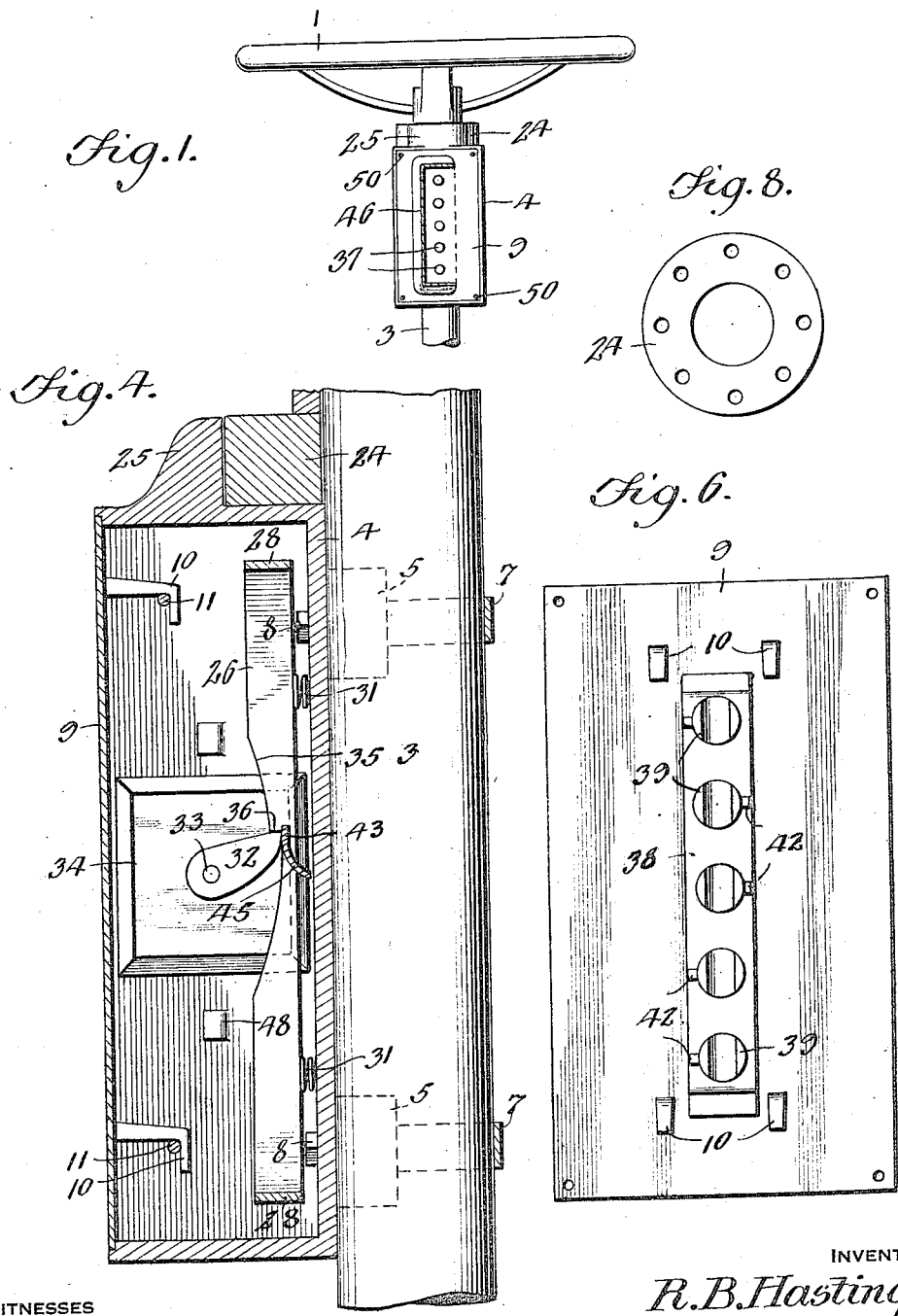

UNITED STATES PATENT OFFICE.

ROBERT B. HASTINGS, OF RIVERSIDE, CALIFORNIA.

STEERING-WHEEL LOCK FOR MOTOR-VEHICLES.

1,260,283.  Specification of Letters Patent.  Patented Mar. 19, 1918.

Application filed November 8, 1916. Serial No. 130,143.

*To all whom it may concern:*

Be it known that I, ROBERT B. HASTINGS, a citizen of the United States, residing at Riverside, in the county of Riverside and State of California, have invented new and useful Improvements in Steering-Wheel Locks for Motor-Vehicles, of which the following is a specification.

This invention relates to steering wheel locks for motor vehicles, the broad object of the invention being to provide in connection with the steering wheel or steering shaft of a motor vehicle, means for locking said parts and preventing the same from being turned thereby preventing unauthorized persons from using the vehicle.

A further object in view is to provide a special lock for the purpose referred to which is of the combination type, not requiring the use of a key, but involving the employment of a number of push buttons or plungers, certain ones only of which must be operated to release the locking bolt, the arrangement being such that if any one or more of the buttons or plungers not in the selected combination are operated, an audible alarm will be sounded, thereby notifying the public at large that some one unacquainted with the combination of the lock is attempting to release the steering wheel for an obvious purpose.

Another object of the invention is to provide lock mechanism of such a character that the combination may be easily changed by the owner of the vehicle without any special mechanical skill.

Another object in view is to so construct and arrange the means for holding the bolt in its locking position, that in case all of the buttons or plungers should be simultaneously operated, the bolt would still be held in its locking position while at the same time the alarm would be sounded, after which the initial bolt latching or holding means would again be brought into action.

With the above and other objects in view, the invention consists in the novel construction, combination and arrangement of parts, herein described, illustrated and claimed.

In the accompanying drawings:—

Figure 1 is a front elevation partly in section illustrating the lock in its applied relation to the steering column of an automobile.

Fig. 2 is an enlarged view of the same, with the adjacent cover plate removed.

Fig. 3 is a section taken in line with the locking bolt but showing said bolt and certain other parts in elevation.

Fig. 4 is a longitudinal section through the casing of the lock taken in line with the latch rail and latch or trip arm.

Fig. 5 is a transverse section on the line 5—5 of Fig. 3.

Fig. 6 is an inner face view of the removable cover plate.

Fig. 7 is a fragmentary view showing one of the spring detents and the means for holding the same either in its operative or inoperative position.

Fig. 8 is a detail bottom plan view of the keeper.

Referring to the drawings 1 designates the steering wheel of a motor vehicle which is mounted fast upon the usual steering shaft (not shown), said shaft passing through the tubular housing or casing 3 forming what is known as the steering column.

In carrying out the present invention, in the preferred embodiment thereof, I employ a casing 4 which is of box-like formation and provided upon one side thereof with a plurality of saddles 5 formed with concaved seats 6 which receive the steering column casing or housing 3 which is fixed or nonrotary in accordance with the present day automobile practice. To secure the casing 4 to the steering column, metal straps 7 are passed around the steering column and the end portions thereof are inserted through holes in the adjacent wall of the casing 4 and are threaded to receive nuts 8 which are arranged interiorly of the casing as indicated in the drawings, thereby preventing the casing from being detached from the steering column except by obtaining access to the interior of said casing by the means hereinafter described.

9 designates a cover plate which closes one side of the casing 4 and which is removable to give access to the mechanism contained in said casing. In the preferred embodiment of this part of the invention, the cover plate 9 is provided on the inner side thereof with projecting hooks 10 which are engaged by fingers 11 projecting from and fixedly secured to a locking bolt 12 which is movable in the direction of its length and mounted in bearing openings 13 and 14 in the opposite ends of the casing as shown. The fingers 11 are arranged in pairs extending at right angles to and in opposite directions from the bolt 12, whereby, when the bolt 12 is moved longitudinally, the fingers 11 are caused to pass under or out of engagement with the hooks 10 on the cover plate 9. The arrangement of the fingers 11 and the hooks 10 is such that when the bolt 12 is in its locking position, the fingers 11 lie under the hooks 10 and thereby prevent the removal of the cover plate 9, it is therefore necessary to first release the locking bolt before the cover plate 9 can be removed.

As shown in Fig. 3, the bolt 12 which is prevented from turning by means of a key or pin 15 which extends through a slot 16 in said bolt, is formed in one side thereof with a plurality of notches 17 forming shoulders adapted to be engaged by a corresponding series of spring detents 18. Each of said detents is constructed and arranged as shown in Fig. 7, being formed with a slot 19 which receives a fixed pivot pin or post 20 around which the detent is adapted to be turned through a part of a revolution. The detent is formed in its under side with depressions 21 either of which is adapted to engage a projection 22 on the adjacent inner wall of the casing 4, in order that said spring detent may be moved through a quarter of a circle or from the full line position of Fig. 7 to the dotted line position thereof, or vice versa. This enables each of the spring detents 18 to be set in position to engage the respective shoulder or notch 17 or to be swung to one side as indicated in Figs. 2 and 3 so that it will not engage the respective notch or shoulder 17. It will, of course, be understood that as many spring detents 18 may be employed as desired and that the bolt may be provided with a similar number of notches or shoulders 17; also one or more of said spring detents may be brought into coöperative relation to the bolt 12 as may be desired. 23 designates a coiled expansion spring which encircles the bolt 12 and operates to thrust said bolt out of locking engagement with a keeper 24 which is fastened in any suitable manner to the steering shaft within the steering column. The casing 4 is provided with a flange 25 which partially embraces the keeper 24 and prevents anyone from inserting a saw blade between the casing and keeper for the purpose of cutting through the bolt 12 at the point where it enters the keeper 24. This feature is clearly shown in Fig. 3.

Mounted within the casing 4 is a trip member shown as comprising parallel rails 26 and 27 connected at their opposite extremities to arms 28, the latter being connected by pivots 29 to brackets or extensions 30 within the casing 4. One or more springs 31 underlie the trip member just referred to and serve to hold the latch rail 26 in engagement with a trip or latch arm 32 on the shaft 33 of an audible alarm contained within the main casing 4. The latch rail 26 is cut away as shown at 35 to allow for the sweep of the arm 32 and is also formed with a shoulder 36 to be indicated by the extremity of the arm 32 for the purpose of holding the audible alarm inactive until the latch rail 26 is shifted by means hereinafter described.

The means for operating the detents 18 and releasing the bolt 12 so that it may be thrust out of engagement with the keeper 24 by the spring 23, embodies a series of push buttons or plungers 37, all of which are alike. Each plunger is mounted slidably in the cover plate 9 and also in a plunger guide 38 shown in the form of a plate or strip secured to the inner face of the cover plate 9 as shown in Fig. 3. At its inner end each plunger is provided with a fork 39 the arms of which straddle the locking bolt 12 as shown in Fig. 5 and are adapted to come in contact with the free end of the respective detent 18 in the manner indicated in Figs. 3 and 5. Each plunger 37 is pressed outwardly by means of a coiled expansion spring 40 interposed between the guide 38 and a collar 41 on the plunger, and each plunger is provided with a laterally extending stud 42 which when properly arranged, is adapted to come in contact with and depress the trip rail 27 forming part of the tripping member. Each of the plungers 37 is capable of being reversed or turned through an arc of 180° so as to dispose its stud 42 at one side or the other to contact with the trip rail 27 or not according to the combination desired. For example in Fig. 3, reading from the top, the second and third plungers 37 are set with the studs arranged in an inoperative position, while the studs of the first, fourth and fifth plungers 37 are set in the opposite direction so as to contact with the trip rail 27. Under such arrangement, in order to release the bolt without sounding the alarm, the operator must press plungers 2 and 3 inwardly. As the last named plungers are pressed inwardly, the fork arms 39 engage the spring detents 18 and shift the same out of engagement with the notches or shoulders 17; this releases the bolt 12 which is then thrust out of engagement by the keeper 24 with the spring 23. Should any one of the remaining plungers be pressed inwardly the stud or studs 42 thereof will contact with the trip rail 27 and swing the trip member on its pivots 29 thereby correspondingly shifting the latch rail 26 and disengaging the arm 32 which then sweeps around a full circle and allows the alarm to be sounded.

In order to prevent the bolt 12 from being released, by simultaneously pressing all of the plungers 37 inwardly, I provide a spring catch 43 attached to the inner wall of the casing 4 and adapted to engage a recess 44 in the adjacent side of the bolt 12 as indicated in Fig. 3, the catch 43 being normally held out of the recess 44 by the arm 32 as shown in Fig. 4 wherein the end portion of the spring catch is provided with a curved or inclined face 45 against which the arm 32 operates as it approaches the position shown in Fig. 4, the arm 32 thus serving to press the catch 43 away from the recess 44, but releasing the said catch so that it may enter the recess 44 when the arm 32 starts on its sweep around a circle. The catch 43 thus prevents longitudinal movement of the bolt 12 throughout the entire sweep of the arm 32 and when such movement of the arm 32 has been completed, the bolt is held by the spring detents 18 as before. However, the alarm has been sounded and by-standers have been notified that someone is tampering with the lock mechanism.

It is preferred to employ a plunger guard 46 as illustrated in Figs. 1, 3 and 5 which partially covers the plungers 37 and serves to conceal the operator's fingers as he is manipulating the proper plungers 37 to release the locking bolt 12. This renders it difficult for persons in the vicinity to observe which buttons are manipulated.

By removing the cover plate 9, access is obtained to all of the interior mechanism of the lock and while said cover plate 9 is removed, the plungers 37, being then out of engagement with the bolt 12, may be reversed or turned half-way around. In this way the combination may be changed. This enables a different combination to be employed in connection with different machines and it further enables the combination to be changed on the same machine from time to time as may be considered advisable or expedient. It is of course, only necessary to use those spring detents 18 which correspond with the plungers 37 that coöperate therewith for the purpose of releasing the locking bolt. The other spring detents 18 may be swung to one side or to an inoperative position as indicated in Figs. 2, 3 and 7.

The casing 4, is provided with any suitable number of sound vents 47, which as shown in Figs. 2 and 5 are protected within the casing by means of guard lips 48 which prevent any implement from being inserted into the casing to manipulate the lock mechanism. Adjacent to one end of the bolt 12, the casing is also formed in the outer side thereof with a concavity or recess 49 the bottom of which lies flush with the adjacent extremity of the bolt when in its locking position as shown in Fig. 3, the feature referred to serving to prevent a pointed instrument from being employed to force the bolt 12 out of its locking position. The cover plate 9 may additionally be fastened in place by screws 50 as indicated by Fig. 1.

I have not shown or described any particular audible alarm, the only essential feature of the alarm mechanism, as far as it relates to the present invention, residing in the trip arm 32 which is normally held by the latch rail 26 and released so as to sound the alarm when said latch rail is compressed out of engagement therewith by an improper manipulation of the plungers 37. When the proper plungers are operated, the latch rail 26 is not affected and therefore the audible alarm is not released and sounded. As a whole, the mechanism will therefore eliminate to a very great extent the theft of automobiles and the like.

The keeper is provided with a plurality of bolt receiving sockets as shown in Fig. 8, and the bolt may be engaged with any one of said sockets, thereby enabling the steering mechanism as a whole to be locked in any desired position, with the wheels setting at any desired angle.

I claim:

1. In alarm and locking mechanism for motor vehicles, the combination of a lock case, a locking bolt movable longitudinally within said casing and provided with a longitudinal series of shoulders, yieldable detents within said casing adapted for movement to engage and disengage said shoulders, a corresponding number of plungers adapted to coöperate with said detents to shift the same out of engagement with said shoulders, and a tripping member movable within said casing and adapted to be actuated by certain plungers, each of said plungers having means to engage said tripping member, the last named means being movable into and out of operative position with relation to the tripping member.

2. In alarm and locking mechanism for motor vehicles, the combination of a lock case, a locking bolt movable longitudinally within said casing and provided with a longitudinal series of shoulders, yieldable detents within said casing adapted for movement to engage and disengage said shoulders, a corresponding number of plungers adapted to coöperate with said detents to shift the same out of engagement with said shoulders, and a tripping member movable within said casing and adapted to be actuated by certain plungers, each of said plungers being provided with a laterally projecting stud and being reversible in order that said stud may be presented at either side of the plane of the locking bolt so that it will engage or fail to engage said tripping member.

3. In alarm and locking mechanism for motor vehicles, the combination of a lock case, a locking bolt movable longitudinally within said casing and provided with a longitudinal series of shoulders, yieldable detents within said casing adapted for movement to engage and disengage said shoulders, a corresponding number of plungers adapted to coöperate with said detents to shift the same out of engagement with said shoulders, a tripping member movable within said casing and adapted to be actuated by certain plungers, each of said plungers having means to engage said tripping member, the last named means being movable into and out of operative position with relation to the tripping member, and a bolt thrust spring serving to shift said bolt to unlocking position when released.

4. In alarm and locking mechanism for motor vehicles, the combination of a keeper, of a lock case, a locking bolt movable longitudinally within said casing and provided with a longitudinal series of shoulders, yieldable detents within said casing adapted for movement to engage and disengage said shoulders, a corresponding number of plungers adapted to coöperate with said detents to shift the same out of engagement with said shoulders, a tripping member movable within said casing and adapted to be actuated by certain plungers, each of said plungers having means to engage said tripping member, the last named means being movable into and out of operative position with relation to the tripping member, and a spring catch movable into and out of engagement with said locking bolt.

5. In alarm and locking mechanism for motor vehicles, the combination of a bolt provided with a longitudinal series of shoulders, spring detents in said casing movable into and out of engagement with said shoulders, each detent being so mounted that it may be moved into and out of bolt engaging position, a corresponding series of plungers each adapted to press one of said detents out of engagement with the locking bolt and each provided with a laterally projecting stud and also adapted to be given a half turn for changing the position of said stud, a tripping member mounted within said casing, and a trip rail arranged at one side of said plungers and adapted to be engaged by the studs on the plungers.

6. In alarm and locking mechanism for motor vehicles, the combination of a bolt provided with a longitudinal series of shoulders, spring detents in said casing movable into and out of engagement with said shoulders, each detent being so mounted that it may be moved into and out of bolt engaging position, a corresponding series of plungers each adapted to press one of said detents out of engagement with the locking bolt and each provided with a laterally projecting stud and also adapted to be given a half turn for changing the position of said stud, a tripping member mounted within said casing, a trip rail arranged at one side of said plungers and adapted to be engaged by the studs on the plungers, a cover plate detachable from said casing and carrying said plungers, hooks projecting from the inner face of said cover plate, and hook engaging fingers movable into and out of engagement with said hooks and carried by the locking bolt.

7. In alarm and locking mechanism for motor vehicles, the combination of a casing, a slidable bolt provided with a longitudinal series of shoulders, spring detents in said casing movable into and out of engagement with said shoulders, each detent being so mounted that it may be moved into and out of bolt engaging position, a corresponding series of plungers each adapted to press one of said detents out of engagement with the locking bolt and each provided with a laterally projecting stud and also adapted to be given a half turn for changing the position of said stud, a tripping member mounted within said casing, a trip rail arranged at one side of said plungers and adapted to be engaged by the studs on the plungers and a plunger guard on said casing for receiving the plunger rods.

8. In alarm and locking mechanism for motor vehicles, the combination of a casing, a slidable bolt provided with a longitudinal series of shoulders, spring detents in said casing movable into and out of engagement with said shoulders each detent being so mounted that it may be moved into and out of bolt engaging position, a corresponding series of plungers each adapted to press one of said detents out of engagement with the locking bolt and each provided with a laterally projecting stud and also adapted to be given a half turn for changing the position of said stud, a tripping member mounted within said casing, a trip rail arranged at one side of said plungers and adapted to be engaged by the studs on the plungers, a latch also mounted in said casing for engagement with the bolt to prevent its longitudinal movement when all the keys are pressed simultaneously.

9. In alarm and locking mechanism for motor vehicles, the combination of a casing, a slidable bolt provided with a longitudinal series of shoulders, spring detents in said casing movable into and out of engagement with said shoulders each detent being so mounted that it may be moved into and out of bolt engaging position, a corresponding series of plungers each adapted to press one of said detents out of engagement with the locking bolt and each provided with a laterally projecting stud and also adapted to be given a half turn for changing the position of said stud, a tripping member mounted within said casing, a trip rail arranged at one side of said plungers and adapted to be engaged by the studs on the plungers, a bolt receiving keeper rigidly secured at the upper end of the casing adapted to receive the bolt, at any position the vehicle steering post is turned.

In testimony whereof I affix my signature.

ROBERT B. HASTINGS.

Copies of this patent may be obtained for five cents each, by addressing the "Commissioner of Patents, Washington, D. C."